UNITED STATES PATENT OFFICE.

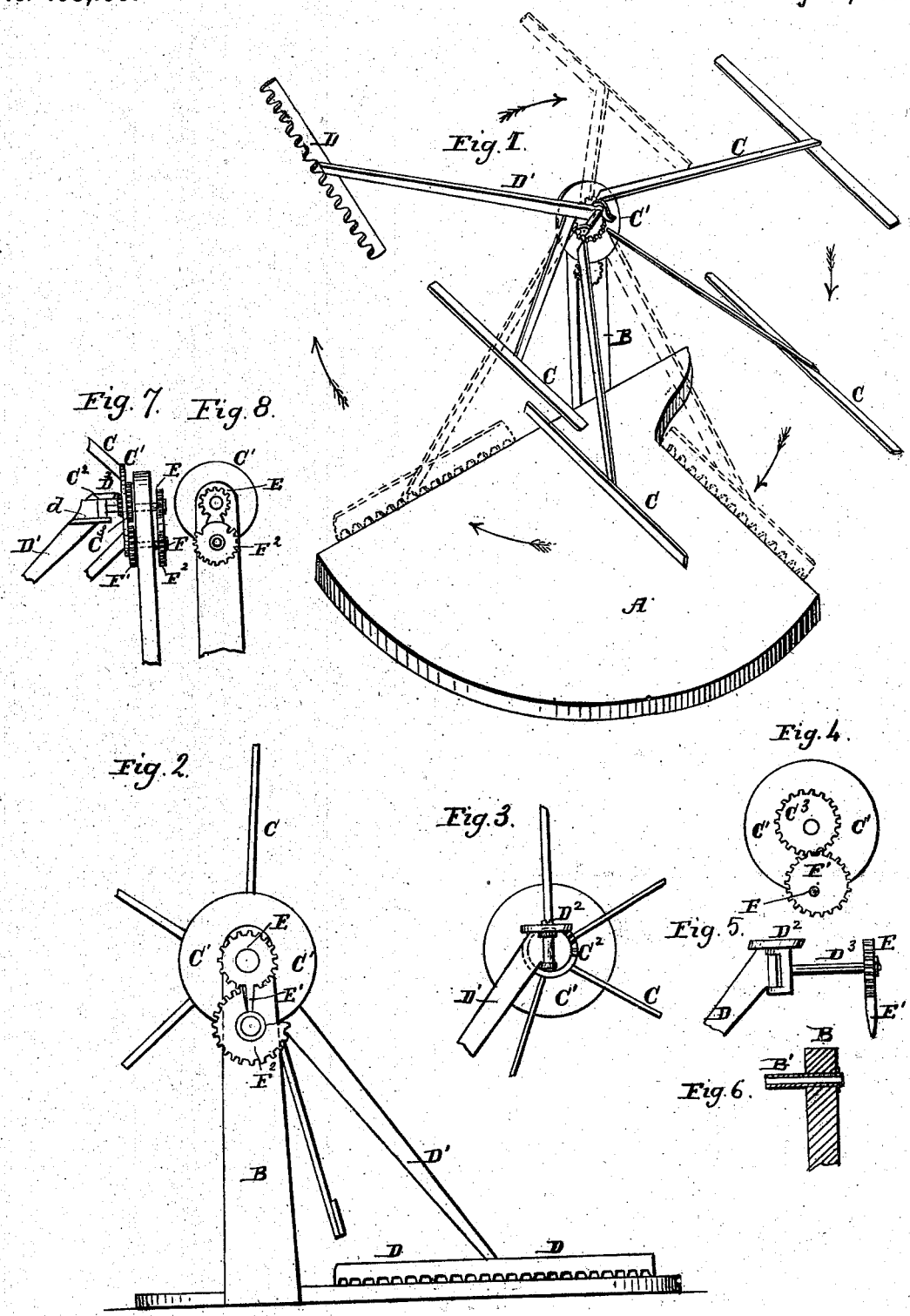
P. F. HODGES.
Harvester Rake.
No. 103,186.
Patented May 17, 1870.

PLINY F. HODGES, OF MOLINE, ILLINOIS.

IMPROVEMENT IN COMBINED RAKE AND REEL FOR HARVESTERS.

Specification forming part of Letters Patent No. 103,186, dated May 17, 1870.

*To all whom it may concern:*

Be it known that I, PLINY F. HODGES, of Moline, in the county of Rock Island and State of Illinois, have invented certain Improvements in Harvester-Rakes; and I do hereby declare that the following is a full, clear, and exact description thereof, reference being had to the annexed drawings, making part of this specification, in which—

Figure 1 is a perspective view, showing a sectoral grain-platform of a harvester with a reel and rake constructed upon my improved plan. Fig. 2 is a side elevation of the same, showing the side nearest to the driving parts of the harvester. Fig. 3 is a side elevation, seen from the other side, and showing the connection of the rake-arm to its shaft, the bevel-segment on the reel-head, and the bevel-segment on the arm of the rake. Fig. 4 shows the eccentric-wheels on the reel-head and the counter-shaft. Fig. 5 is another view of the rake-arm, hinged to the intermittently-rotating shaft, with the spur-wheel upon the outer end of the latter. Fig. 6 is a vertical section through the reel-post, to show the hollow stud or shaft upon which the reel revolves, and in which the shaft of the rake-arm has its bearing. Fig. 7 is a front elevation of the train of gearing by which the reel and rake are driven. Fig. 8 is a view similar to that shown in Fig. 2, to show a modified construction of the spur-wheels upon the counter-shaft and the intermittently-rotating shaft to which the rake-arm is hinged.

The same letters are used in all the figures in the designation of identical parts.

This invention relates to harvesters; and it consists in combining with the reel thereof a rake which is hinged to an intermittently-rotating shaft, and derives its curvilinear movement around the axis of the reel from such shaft, and its horizontal sweeping movement over the grain-platform from the reel, as will be more specifically set forth in the following specification and claim.

To enable those skilled in the art to make and use my invention, I will now proceed to describe its construction and operation.

In the annexed drawings, A represents a sectoral grain-platform, to be attached in any approved manner to a harvesting-machine. Upon the inner and front corner of this platform, or other convenient place on the machine, the reel-post B is erected, it being of suitable height and strength to afford support to, and withstand the vibrations of, the reel, rake, and their operating mechanism.

Suitable bearings are formed in the upper portion of the post, in one of which the counter-shaft is placed, and in the other one the intermittently-rotating shaft of the rake-arm. The latter bearing, projecting some distance through the post over the grain-platform, forms a hollow stud or shaft, B', upon which the reel turns.

The reel, instead of turning upon the stud B', as described, may revolve within the same, in which case it is provided with an elongated hollow axle, which, in turn, receives and supports the intermittently-rotating shaft of the rake.

C represents the reel, constructed as shown, or in any other approved manner. A central aperture is formed in its head, $C^1$, to receive the hollow shaft B', upon which it turns. Upon its outer face the reel-head has a bevel-segment, $C^2$, through the medium of which the horizontal sweeping movement is imparted to the rake, while upon its outer side it has a spur-wheel, $C^3$, which drives the spur-wheel upon the counter-shaft, soon to be described.

D represents the rake-head, provided with teeth in the customary manner, and rigidly attached to an oblique arm, $D^1$, extending from it to a point near the outer face of the reel-head, and a little distance above the axis of the same, and terminating in a horizontal segmental bevel-wheel, $D^2$, which meshes into the bevel-segment $C^2$ on the reel-head.

If it is desirable to give to the rake, while sweeping the grain from the platform, a slower movement than the uniform velocity of the reel, the radius of this segmental bevel-wheel must be made somewhat greater than that of the bevel-segment $C^2$.

$D^3$ is the intermittently-rotating shaft of the "rake-arm," as I have called it, it being a shaft to which the rake is hinged, passing through the hollow stud upon which the reel turns. The outer end of this shaft carries the spur-wheel E, which is firmly secured to it, and transmits to the shank the intermittent rotary motion which it receives from a sectoral wheel upon the counter-shaft. This wheel E is held stationary during the sweep of the rake over the grain-platform by means of an elongated tooth, E′, which enters into the recess in the sectoral wheel by which it is driven. This tooth also serves as a guide to insure the proper engagement of the two wheels.

In Fig. 7 I have shown wheels slightly modified in construction, operating, however, in substantially the same manner. In this case the driving-wheel is deprived only of the required number of its cogs without cutting out a sector, as in the former instance, and the wheel E has an enlarged or widened tooth shaped to fit upon the blank portion of the periphery of the driving-wheel.

F represents a counter-shaft, arranged in a bearing through the reel-post at the proper distance from the axis of the reel and shaft $D^3$ of the rake-arm. Upon its inner projecting end a spur-wheel, $F^1$, is secured, meshing into and driven by the spur-wheel $C^3$ upon the reel-head, it being made of the same diameter with the latter wheel.

I prefer to give a variable motion to the rake during its travel around the axis of the reel, starting it slowly from the rear end of the grain-platform, and, gradually accelerating its motion, again retard it as it approaches the front end of such platform. This movement is obtained by arranging the spur-wheels $F^1$ and $C^3$ eccentrically to their axes of rotation, as clearly shown in Fig. 4. Upon the other or outer end of the shaft F a spur-wheel, $F^2$, is fastened, meshing into the wheel E, and driving the same.

In order to carry the rake from the rear of the grain-platform to its front, the flexible shaft from which the rake derives its motion has to make an entire revolution around its axis; and as this revolution must be accomplished during a portion of the time it takes the wheel $F^2$ to revolve, the relative diameters of the wheels E and $F^2$ must be such that they have an equal number of cogs.

From the above description it will be understood that the principal feature of my invention consists in hinging the rake-arm to a shaft having an intermittent rotary motion within the axle of a continuously-revolving reel, from which shaft the rake derives only its curvilinear movement around the axis of the reel, its horizontal sweeping movement being produced by the action of the bevel-segment on the reel-head upon the segmental bevel-wheel on the rake-arm during the pause in the motion of such shaft, which pause enables the rake to be thus moved.

The operation of this rake may be described as follows: Motion being given to the reel from the driving-axle of the machine, the rake, supposing it to be in the position shown in full lines in Fig. 1, is revolved with the reel in a curvilinear track around the axis of the same, by its intermittently-rotating shaft, until it reaches, or nearly reaches, the front edge of the grain-platform, on reaching which point the motion of the shaft is stopped by the elongated or widened tooth of its wheel, and a horizontal sweeping movement over the platform imparted to the rake by the action of the bevel-segment on the reel-head upon the segmental bevel-wheel on its arm. As soon as the rake reaches the other end of the platform its shaft will be again put in motion, causing the rake to be lifted and carried in a curvilinear track around with the reel, it being prevented during this movement from swinging around loosely by the bevel-segment on the reel-head, upon which it gains sufficiently to obtain the proper position before reaching the front edge of the grain-platform.

What I claim as my invention, and desire to secure by Letters Patent, is—

The combination of a continuously-revolving reel, and a rake hinged to a shaft which rotates intermittently within the periphery of the axle of said reel, the rake deriving its revolving motion from said shaft and its horizontal sweeping motion from the reel, as and for the purpose hereinbefore set forth.

In testimony whereof I have signed my name to this specification in the presence of two subscribing witnesses.

P. F. HODGES.

Witnesses:
C. F. CLAUSEN,
B. EDW. J. EILS.